United States Patent
Lindgren et al.

(10) Patent No.: US 10,306,284 B2
(45) Date of Patent: May 28, 2019

(54) ABR ADJUSTMENT FOR LIVE OTT

(71) Applicant: NET INSIGHT INTELLECTUAL PROPERTY AB, Stockholm (SE)

(72) Inventors: Per Lindgren, Strangnas (SE); Christer Bohm, Nacka (SE); Anders Cedronius, Alvsjo (SE); Hans Insulander, Sollentuna (SE)

(73) Assignee: Net Insight Intellectual Property AB, Stockholm (SE)

( * ) Notice: Subject to any disclaimer, the term of this patent is extended or adjusted under 35 U.S.C. 154(b) by 0 days.

(21) Appl. No.: 15/519,911

(22) PCT Filed: Dec. 5, 2016

(86) PCT No.: PCT/EP2016/079711
§ 371 (c)(1),
(2) Date: Apr. 18, 2017

(87) PCT Pub. No.: WO2017/097691
PCT Pub. Date: Jun. 15, 2017

(65) Prior Publication Data
US 2018/0270521 A1    Sep. 20, 2018

(30) Foreign Application Priority Data
Dec. 7, 2015    (SE) ..................................... 1551602

(51) Int. Cl.
*H04L 1/00*    (2006.01)
*H04N 21/2662*    (2011.01)
(Continued)

(52) U.S. Cl.
CPC ....... *H04N 21/2662* (2013.01); *H04L 1/0002* (2013.01); *H04L 1/0019* (2013.01);
(Continued)

(58) Field of Classification Search
CPC ... H04N 21/2662; H04L 47/263; H04L 47/38; H04L 47/823; H04L 1/0002; H04L 1/0019; H04L 65/60; H04L 47/822; H04L 1/0022
See application file for complete search history.

(56) References Cited

U.S. PATENT DOCUMENTS

| | | | |
|---|---|---|---|
| 8,693,320 B2* | 4/2014 | Furbeck | H04L 47/10 370/229 |
| 9,544,352 B2* | 1/2017 | Mueller | H04L 65/80 |

(Continued)

OTHER PUBLICATIONS

International Search Report PCT/ISA/210 for International Application No. PCT/EP2016/079711 dated Mar. 24, 2017.
(Continued)

*Primary Examiner* — Alina A Boutah
(74) *Attorney, Agent, or Firm* — Harness, Dickey & Pierce, P.L.C.

(57) ABSTRACT

There is provided a mechanism for providing Adaptive Bit Rate adjustments of media streams like video for live Over the Top distribution without the need to monitor buffer fill levels, which is advantageous for live video distribution over IP networks. An embodiment of the invention is based on monitoring change in the received bitrate level at a client device, and providing a predicted future bandwidth characteristics of the network based on the change. By monitoring the received bitrate and its rate of change over time, a prediction of (near future) available bandwidth in the network is advantageously provided. A drastic drop of the received bitrate may for instance indicate that the available bandwidth will become too low to sustain a currently received media stream, and the system can accordingly initiate a decision to request a lower video quality.

19 Claims, 4 Drawing Sheets

(51) Int. Cl.
*H04L 12/811* (2013.01)
*H04L 12/911* (2013.01)
*H04L 12/825* (2013.01)
*H04L 29/06* (2006.01)

(52) U.S. Cl.
CPC .......... *H04L 1/0022* (2013.01); *H04L 47/263* (2013.01); *H04L 47/38* (2013.01); *H04L 47/822* (2013.01); *H04L 47/823* (2013.01); *H04L 65/60* (2013.01)

(56) References Cited

U.S. PATENT DOCUMENTS

| | | |
|---|---|---|
| 2004/0071085 A1 | 4/2004 | Shaham et al. |
| 2005/0220035 A1 | 10/2005 | Ling et al. |
| 2005/0283809 A1* | 12/2005 | Kim .................. H04N 21/2662 725/81 |
| 2006/0045023 A1 | 3/2006 | Kim et al. |
| 2009/0052320 A1 | 2/2009 | Ling et al. |
| 2014/0192799 A1* | 7/2014 | Huang .................. H04L 47/808 370/352 |
| 2016/0127215 A1* | 5/2016 | Mani ..................... H04M 15/56 370/252 |
| 2016/0127260 A1* | 5/2016 | Gordon ................ H04L 47/783 709/226 |
| 2016/0134673 A1* | 5/2016 | MacInnis ................ H04L 65/60 709/231 |
| 2018/0220170 A1* | 8/2018 | Yu ........................ H04N 21/238 |

OTHER PUBLICATIONS

Written Opinion of the International Searching Authority PCT/ISA/237 for International Application No. PCT/EP2016/079711 dated Mar. 24, 2017.

* cited by examiner

ABR ADJUSTMENT FOR LIVE OTT

PRIORITY STATEMENT

This application is the national phase under 35 U.S.C. § 371 of PCT International Application No. PCT/EP2016/079711 which has an International filing date of Dec. 5, 2016, which designated the United States of America and which claims priority to Swedish patent application number SE 1551602-4 filed Dec. 7, 2015, the entire contents of which are hereby incorporated herein by reference.

FIELD

The present invention relates to broadcasting and media distribution over IP networks, and more particularly to Adaptive Bit Rate (ABR) adjustments of media streams like video for live Over the Top (OTT) distribution.

BACKGROUND

In media distribution over an IP network, such as video and TV distribution over the Internet, the bandwidth to a client device will vary depending on various circumstances. When accessing the distributed media content over a mobile data network or a Wi-Fi network the capacity is shared between client devices. Further, individual client devices might enter locations with weaker or stronger signal affecting the bandwidth received by the client.

Today, variation in bandwidth as conceived by the client device is typically handled by three mechanisms: congestion control mechanisms of TCP (transmission control protocol of the TCP/IP protocol stack), buffering, and adjusting the video bitrate (ABR). Basically, congestion control is handled by the TCP protocol stack which adjusts the retransmission rate of lost packets to adapt the client device to use a fair share of the available bandwidth in the network (or actually in the bottleneck of the transmission). In such system, the client device needs to buffer data since it is not certain the network can offer enough bandwidth required by the video stream. In order to maintain the viewer experience the client device needs to have video data to present, so buffering is needed to absorb variances in bitrate introduced by the network, specifically by the TCP congestion avoidance mechanisms and the jitter introduced by the network. As the capacity and jitter varies in the IP network, the receiving client device must pause the presentation of the current video on the screen to accumulate more video data in its buffer. The accumulation is one method, meaning that the delay will increase and not decrease for a specific session. Such adjustments will introduce delay and the video cannot be considered live distribution due to the added delay.

According to the European Broadcasting Union, EBU, which defines TV standards in Europe, live TV is defined as a broadcasting delay from the ingress to the client device display or screen lower than seven seconds. Delay caused by the adjustments above may however end up in several minutes of delay.

More specifically, one of the most common ways to distribute video over the Internet is to use HLS (HTTP Live Streaming) or MPEG-DASH where the video stream is divided into typically 10 second (2-10 sec) video files (segments) making the linear video stream a series of 10 second video files. Every stream is typically represented by several bitrates (different video qualities), each being segmented into equivalent segment files. The client device then requests these files using normal http technology. To ensure that the client device always has video data to present, at least 3 time wise consecutive files are buffered in the device. This means that buffering will impose at least 30 seconds of delay. At start-up the buffer is filled up to a certain level, typically 30 seconds, corresponding to three 10 second segments. If packets are lost, the transport protocol TCP used by the HTTP protocol requests the data again and if uncertain if it can recover the whole segment file, also reduces the bitrate on outgoing traffic by requesting the next corresponding segment file of a lower bitrate to avoid congestion.

Over IP networks the bandwidth of a distributed video, i.e. the encoded bitrate of the video, is adjusted to the bandwidth available in the network to the client device. The video is encoded in different predefined bitrates (i.e. the level of compression of the video is differentiated, which in turn provides different quality levels of the video). This is typically done by a transcoding system which takes in an encoded video stream and then "re-encodes" it into one or several video streams with different bitrates, qualities and formats for different devices. The network system decides which encoded bitrate is applicable for the specific moment and selects the most suitable video quality to transfer to the client. In existing solutions, ABR adjustments, i.e. adjustment of the video bitrate/quality, are done based on the fill level of the buffer of the client device. More particularly, the decision to change to another encoded bitrate is done by monitoring the buffer fill level in the client device. A decreasing fill level indicates that the bandwidth of the network is lower than needed and the system needs to select a video with lower quality. Shifting to a higher quality video stream is done by simply testing a higher video bit rate and watching if the buffer fill level decreases. If it decreases, the system needs to go back to a lower video bit rate. This means that there will be continuous changes in ABR levels during the operation with the exception if the system is running on the highest ABR level and the buffer is not becoming empty. To avoid glitches in the video when changing between bit streams of different bit rates, the change is performed between segments, i.e. one start using the corresponding new segment of the new bitrate stream.

Although this approach to perform ABR adjustments of video by monitoring the buffer fill level may be applicable for video on demand services, there is a need for an improved method to perform ABR adjustments for video in IP network systems since the buffering of multiple segments at the device and possibly also in edge caches, and also the continuous adjustments of the ABR level increases the buffer fill level at the device, thereby increasing the delay before the video is displayed in the device. The accumulated delay happens because imperfections of using TCP to determine the network bit rate (which continuously is changing) force the client device to buffer more video data to avoid the buffer to run empty which in turn disrupts the video presentation. Typically, today's OTT systems start with an initial delay of 30-60 seconds depending on encoding delay, segment sizes, distribution network and client player implementation. This accumulates over time and e.g., the HLS protocol allows a client to buffer up to 15 minutes.

SUMMARY

It would be advantageous to provide an improved method for ABR adjustment which facilitates live distribution of media content, such as TV/video/audio streams, in an IP network like the Internet while avoiding a "growing" buffer problem and thereby long and increasing delays.

This object is achieved by a method according to the present invention as defined in claim 1, which is directed to a mechanism for providing ABR adjustments in a network without the need to monitor buffer fill levels, which would be advantageous for live video distribution over IP networks, in which case it is not desired to have a buffer filling up since this removes the live characteristics of the distribution. The invention is based on an insight that by monitoring change in the received bitrate level at a client, and providing a predicted future bandwidth characteristics of the network based on the change, ABR level adjustment is provided without overloading the network system.

In accordance with an aspect of the present invention, a method is provided for adaptive bitrate (ABR) adjustments in an IP network comprising monitoring a received bitrate of a media stream with a preset bitrate defined by the media stream, determining a rate of change of the received bitrate, and adjusting the preset bitrate based on the rate of change. By monitoring the received bitrate and its rate of change over time, a prediction of (near future) available bandwidth in the network is advantageously provided. A drastic drop of the received bitrate may for instance indicate that the available bandwidth will become too low to sustain a currently received media stream, and the system can accordingly initiate a decision to request a lower video quality. This means that in a system with a number of discrete ABR levels, the system can, in accordance with an embodiment of the inventive concept, utilize the prediction to immediately change to the most suitable one without needing for example to decrease one level, see that it does not work and then change again, or to be very conservative and by default select the lowest level and then change upwards. Here the most suitable ABR level can be selected immediately.

The inventive concept advantageously ensures that a currently replayed video continues uninterrupted in case of varying network capacities. Considering the adjustments of the quality both upwards and downwards, the invention offers that the viewer gets the best quality given the current network condition (capacity, loss, etc.) by adjusting the ABR level upwards when the network capacity allows it, and downwards when quality/capacity of the network suffers. Other services will also gain some capacity because of adjustments to lower capacity in case of network capacity problems. By providing better predicted adjustments the number of adjustments is reduced making the service more stable.

The preset bitrate of the media stream is herein defined as information regarding a present ABR-level and/or encoded bitrate of the media stream, i.e. the expected or target bitrate to be received at the client device when the Quality of Service in the IP network is sufficient. The step of adjusting the bitrate may include requesting media stream transfer with a different ABR-level and/or a different encoded bitrate from an origin server, edge cache server (CDN), or last mile streaming server. The rate of change of the received bitrate may be determined by measuring the received bitrate BR for sample intervals and comparing adjacent measurements, or is preferably done by using a signal analyzer to repeatedly determine the rate of change of the monitored received bitrate at the client.

According to an embodiment of the method, if the rate of change is negative the method further comprises determining if the received bitrate is predicted to reach a predetermined minimum threshold level within a threshold time period (typically corresponding to the size of the playout buffer size with a fixed fill level), and if so providing a new bitrate, which is lower than the preset bitrate, and adjusting the preset bitrate to the new bitrate. If the rate of change is negative, it is indicated that the received bitrate is decreasing. Thus, an estimate of the future received bitrate, or alternatively an estimate of the expected bandwidth availability of the IP network, is provided based on the rate at which the received bitrate is decreasing over a certain threshold time period, which is then compared to a minimum required transfer bitrate over the IP network/bandwidth. If the estimate indicates that the minimum threshold level will be reached within a near future, the decision is made to adjust the preset bitrate to a lower value. This advantageously provides fewer adjustments of the ABR level, and reduces the risk of setting a new ABR level, which still consumes too much capacity not solving the problem rapidly enough. In a preferred embodiment, the new bitrate is selected to be lower than the predetermined minimum threshold level.

According to an embodiment of the method, the threshold time period is selected to be shorter the closer the received bitrate level is to the minimum threshold level. The threshold time period may e.g. be selected to be reciprocally proportional to the difference between the received bitrate level and the minimum threshold level ($\neq 0$). The estimated future values of the received bitrate or available bandwidth, is based on the current rate of change. In addition, as the received bitrate is closing in to critical values, the responsiveness of the estimate increases, and the estimate is calculated over a shorter period of time.

According to an embodiment of the method, the received bitrate is monitored by comparing time stamps of the received media stream with a local time of a local clock of the client, and utilizing that the time difference between the received time stamps and the local time when being received can be considered proportional to the available bitrate. For example, if the media stream has a preset/transfer bitrate of 4 Mbps and the interval in the local time between the received items is double the interval between the time stamps of the media stream, the available bit rate is half of the sent bit rate, i.e., 2 Mbps. Since the incoming received media stream might jitter a more reliable measurement is done by performing a sliding average within the threshold time period. To react before going into a situation where ABR changes can't be made without corrupting the data, the threshold time period is according to an embodiment adjusted depending on distance between Instantaneous Decoder Refresh (IDR frames) in the compressed stream.

According to an embodiment of the method, if the determined rate of change is positive or zero, the method may further comprise: temporarily increasing a transfer bitrate of the video stream to a higher new bitrate, determining if the new bitrate is applicable, and if the new bitrate is applicable adjusting the preset bitrate to the new bitrate. Advantageously, if the rate of change of the received bitrate and/or the received bitrate indicates that the estimated future bandwidth availability is sufficient for the current selected ABR level or encoded bitrate of the received media stream, a higher ABR level or encoded bitrate is tested and if applicable the ABR level is adjusted to a higher level.

According to an embodiment of the method, the step of temporarily increasing the transfer bitrate of the video stream comprises adding a forward error correction, FEC, code to the media stream, which is advantageous as the FEC code ensures that if packet loss starts to occur, possibly due to the increased transfer bitrate, reconstruction of lost packets may be performed.

According to an embodiment of the method, the step of temporarily increasing the transfer bitrate comprises transferring the media stream with a momentarily higher bitrate by detaining the media stream and subsequently transmitting a short burst of data. Thereby, the total load on the network is kept constant, i.e. no additional data is injected in the data stream transport over time. Also, there is no need to change the ABR level which, if it takes time, might overload the system. According to an embodiment, the step of temporarily increasing the transfer bitrate of the video stream comprises a combination of adding FEC and detaining the media stream before transmission.

According to an embodiment of the method, the determining if the new bitrate is applicable is based on at least one of: the determined rate of change for subsequent sample intervals is positive or zero, monitoring of packet drop ratio, e.g. showing increase in packet drop, and comparing of interpacket arrival time and interpacket transfer time. If subsequent measurements indicate low interpacket receiving times, and/or jitter compared to interpacket transmission times there is an increased probability that the network can sustain a higher ABR level. These techniques are advantageous, as they are fairly easy to implement in the device.

According to an embodiment of the method, it further comprises selecting the new bitrate from a list of available bitrates, which is advantageous as no dedicated transcoding per device is required.

According to an embodiment of the method, if the new predicted bitrate is below a predetermined minimum value, the new bitrate is selected based on manual choice or by a customer profile. The predetermined minimum value may for instance be defined as a bitrate value which is too low to sustain live transfer of the media stream. The benefit of manual choice is for example if the capacity of the access is expensive, as for example in mobile networks, the user might select a lower bitrate to save money. Also, it can be that in for example a home network, the TV service shall not compete with other services.

According to an embodiment of the method, the manual choice or customer profile comprises at least one of selection whether to abandon live transfer, and selection of priority of quality level and/or prioritized media content. Transfer of prioritized media content may include prioritizing audio data, while sending only still pictures with some interval etc. depending on what is important for the user.

According to an embodiment of the method, the customer profile is retrieved from an external source, such as Google customer statistics, etc., which is advantageous since the customer experience is optimized automatically without need for the user to make any adjustments.

According to an embodiment of the method, if the determined rate of change is less than a predetermined value or zero, the step of adjusting the preset bitrate comprises maintaining the preset bitrate B. The current settings may be maintained if the available bandwidth of the IP network is determined to be sufficient for live streaming of the media content of the media stream.

According to an aspect of the invention, there is provided a node in a communication network comprising means for performing a method according to the inventive concept.

According to an embodiment of the inventive concept, the node or system in which the node is arranged is provided with a buffer (optional), which for example is a buffer that has fixed fill level and which is used to align delay between different devices.

According to an aspect of the invention, there is provided a software module adapted to perform a method according to the inventive concept, when executed by a computer processor.

Embodiments of the present inventive method are preferably implemented in node to node communication by means of a module for signaling and data transport in form of software, FPGA, ASIC or other suitable arrangement, adapted to perform the method of the present invention (not shown). The software module and/or data-transport module may be integrated in the node comprising suitable processing means and memory means, or may be implemented in an external device comprising suitable processing means and memory means, and which is arranged for interconnection with an existing node.

Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the invention, wherein other parts may be omitted or merely suggested.

DETAILED DESCRIPTION OF EXAMPLE EMBODIMENTS

Figure 1:
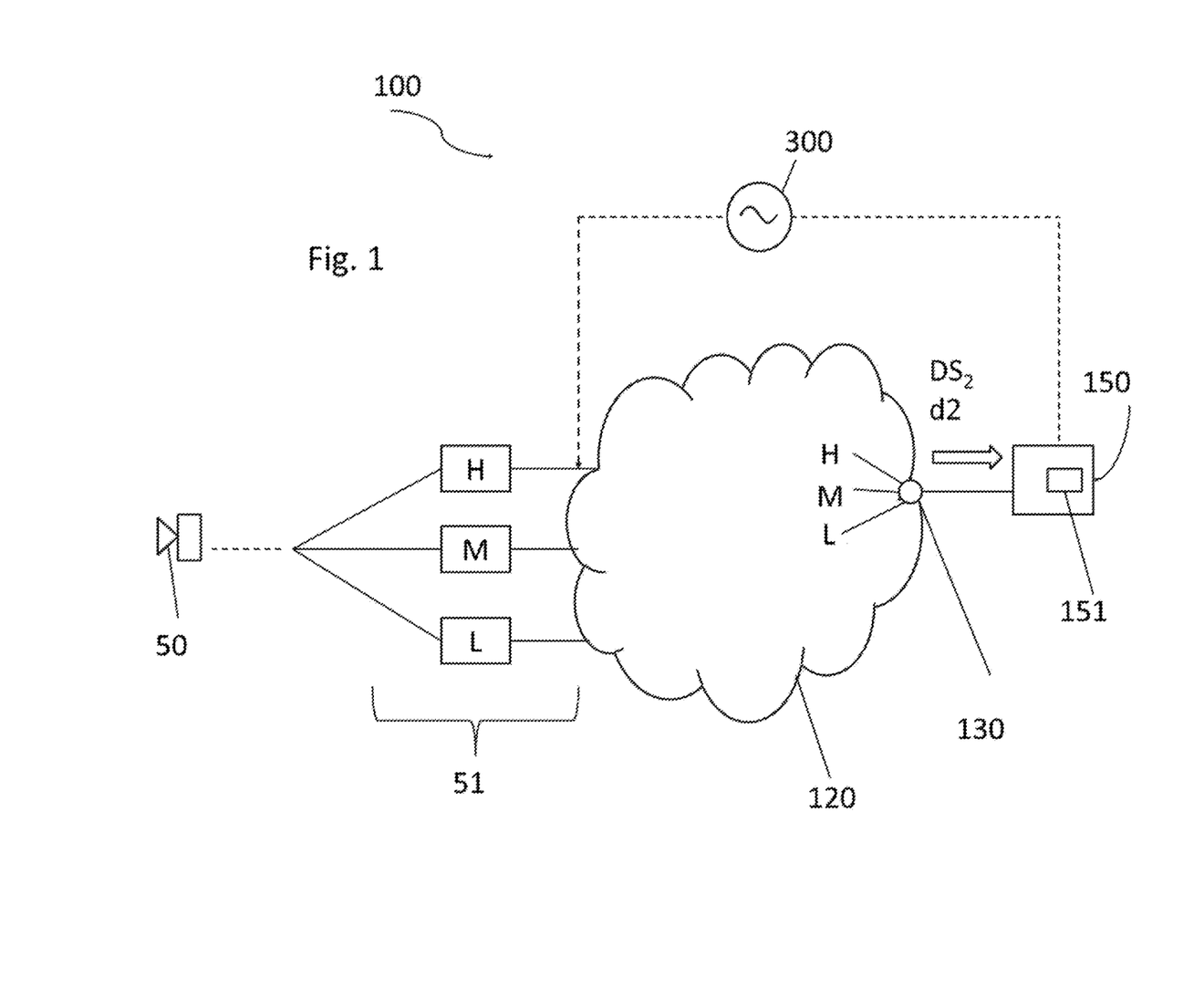
FIG. 1 is a schematic block diagram illustrating a media distribution system according to an embodiment of the present invention.

FIG. 1 is a block diagram schematically illustrating a media distribution system 100 of IP type for live distribution of e.g. video, in view of which aspects of the inventive concept will be described. At an ingress point 50 a broadcast location (TV network, local TV studio, cable system, etc.) the original encoded media stream is re-encoded in an equipment, transcoders 51, into new media content in packet streams with different quality, here represented as media streams high H, medium M, and low L. The media content is distributed via a network 120 to a playout server 130, from which a client device 150 at a viewer location requests a media stream of selected quality level (H, M, L) to display. Requests can be made to the playout server 130 or some special server handling control communication from the devices. The selected quality level is associated with an expected ABR-level or encoded bitrate level Benc (or preset bitrate BO, or transfer bitrate from the source) which, as long as the bandwidth capacity of the network 120 is sufficient, will be received as a received bitrate BR at the client device 150. The client device 150 comprises means for processing received media content and to select media content to display on a display 151.

According to an embodiment of the invention, in the distribution network system 100, the playout server 130 is arranged to determine when in time video and audio in the media stream shall be presented at the client device 150. The playout server 130 provides playout time stamps to the data stream to control when video and audio data shall be presented. The system is arranged for employing mechanisms of the present inventive concept to determine if and when to adjust the ABR level and/or optionally to request a suitable new video bitrate, and the client device is thus not required to contain a large buffer. Mechanisms to determine when to decrease and increase the video bitrate is presented herein:

adjusting the video bitrate based on monitoring bitrate at a client device, and determining if the bitrate of receiving data is sufficient or not for the video stream based on the rate of change of the monitored bitrate at the client device, decreasing the video bitrate if the monitored bitrate at the client device is getting too low, testing an increase of the video bitrate if the bitrate at the client device seems sufficient, and determining which new bitrate is applicable.

According to an embodiment of the invention, in order to provide the ABR adjustment, the client device 150 is arranged to monitor the received bitrate BR over time. According to embodiments BR is monitored continuously, at each instant of time, or repeatedly at predetermined time intervals. The predetermined time intervals are preferably selected between 1-10 times per second.

Figure 2:
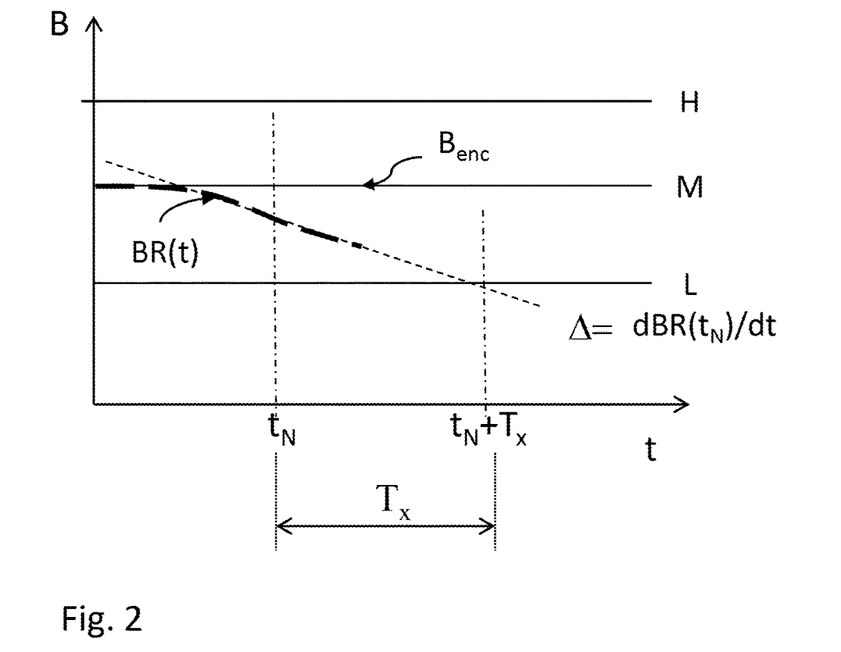
FIGS. 2 to 4 are diagrams schematically illustrating monitoring of a received bitrate level at a client as a function of time according to embodiments of the invention.

An exemplifying diagram of a bitrate change measurement according to an embodiment of the invention is illustrated in FIG. 2, where BR as a function of time, BR(t), is plotted in a diagram (y-axis corresponding to measured bitrate B, and x-axis corresponding to time (t) is plotted with respect to time.

In the diagram, the three available bitrate levels High, H, medium, M, and low, L, of the distributed media are plotted in the diagram to illustrate the different ABR rates. At a selected time instance $t_N$ the rate of change $\Delta=dBR(t_N)/dt$ of the received bitrate BR is determined. In FIG. 2, the plotted BR as a function of time BR(t) is decreasing and the rate of change $\Delta$ is negative. Depending on the derivative of the monitored bitrate at the selected time instance, a prediction if the received bitrate BR is expected to reach a critical value defined by a predetermined minimum threshold level $BW_{min}$ (here selected to be the low available bitrate L) within a threshold time period $T_x$ is made. In FIG. 2 the deviation from the expected bitrate $B_{enc}$ (equal to M) is negative and not neglectable. At this particular time instance, a decision to change the preset bitrate of the received media stream is made, since with the current change rate, the predetermined minimum threshold level $BW_{min}$ will be reached within the preset threshold time $T_x$. We can thus predict that BR(t) will cross L based on dBR/dt and adjust the ABR level accordingly.

The monitored received bitrate BR is drastically decreasing in this scenario, and since it is determined that the predetermined minimum threshold level $BW_{min}$ will be reached within the threshold time period $T_x$, a new lower bitrate, here selected to correspond to a medium quality L data stream, is determined and requested from the playout server 130 by the client device 150. The preset bitrate is thus set to the new lower bandwidth and subsequently the expected bitrate $B_{enc}$ will correspond to the low L.

According to an embodiment, the threshold time period $T_x$ is selected to be shorter, the closer the received bitrate level BR is to the minimum threshold L.

According to an embodiment of the present inventive concept, if it is decided that the rate of change $\Delta$ of the received bitrate BR is positive or zero, i.e. the bitrate is increasing or is constant, the method further provides steps for attempting to increase the current preset bitrate to a new higher bitrate. The method provides testing a higher bitrate performed by temporarily increasing a transfer bitrate of the video stream to a higher new bitrate Bx, and determining if the new bitrate Bx is applicable. For example, 9 packets are detained before transmission and at the arrival of a 10'th packet all ten packets are transmitted back-to-back. As the transfer bitrate is increased the received bitrate BR at the client device is monitored and the rate of change $\Delta$ is determined for a number of time instances.

Figure 3:
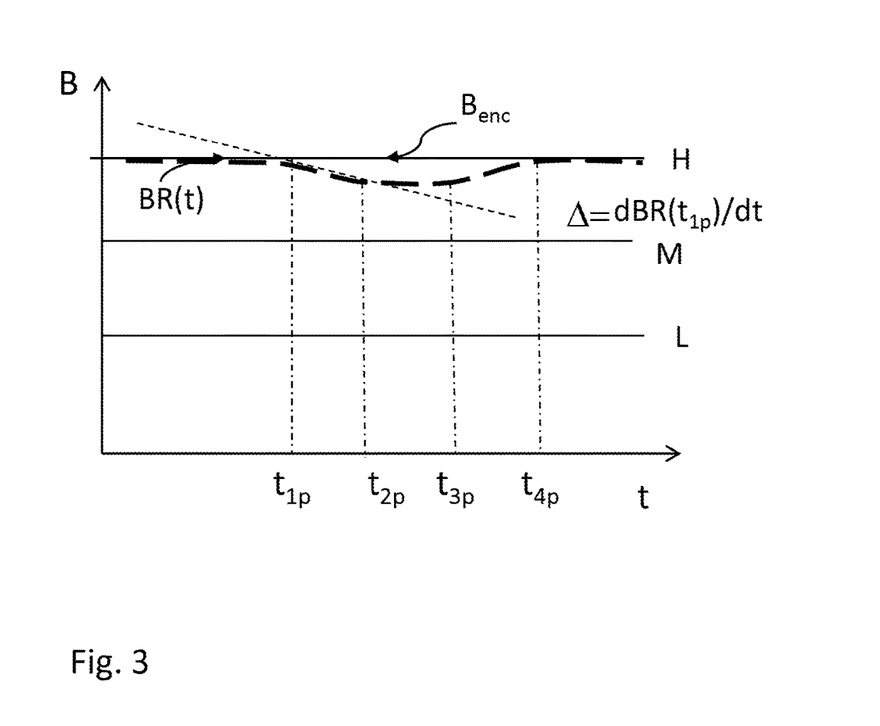

In an exemplifying embodiment, the rate of change $\Delta$ is determined each time a packet is received. FIG. 3 illustrates four packets being received at time instances $t=t_{1p}, t_{2p}, t_{3p}$, and $t_{4p}$, respectively. The expected bitrate $B_{enc}$ is here equal to H. The received bitrate BR is monitored and for each packet arrival, the rate of change $\Delta$ (dBR(t)/dt) changes. In FIG. 3, at $t_{1p}$, the rate of change is negative, at $t_{2p}$ the rate of change is zero, at $t_{3p}$ the rate of change is positive at $t_{4p}$ the rate of change is zero. In the scenario shown in FIG. 3, the order of magnitude of the threshold time $T_x$ is more than 4 times of the interpacket arrival times, and in this case BR is not predicted to reach the minimum threshold level and no request for a lower ABR level is performed. The drop in received bitrate BR is here only temporary and not predicted to require a change of the requested bitrate $B_{enc}$.

Figure 4:
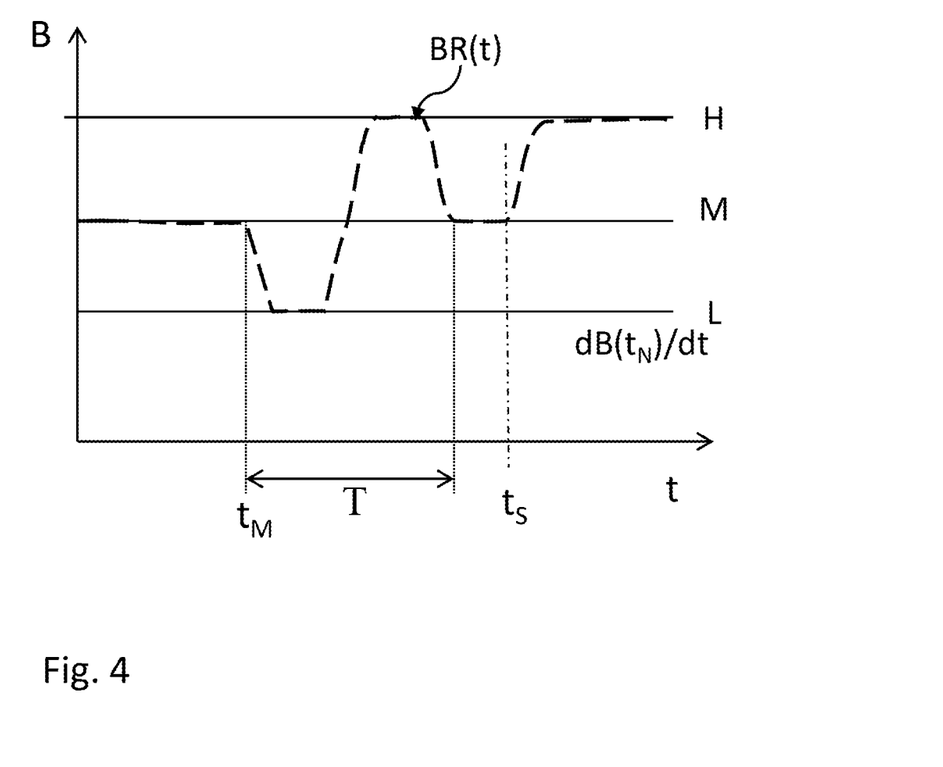

Referring now to FIG. 4, which illustrates a scenario of the BR response when monitoring the received bitrate BR of the transferred data stream at the receiving client, at time $t_M$ a testing period T is initiated, in which the transferred data bitrate is first decreased by detaining the media stream and subsequently increased by transmitting a short burst of data. In this example, it is determined during the testing period that the increase in transferred data bitrate is applicable, and a new preset bitrate (H), i.e. a quality level that the received bitrate is estimated to be able to support, is selected at a time $t_S$ in FIG. 4.

According to an embodiment of the inventive concept, the temporary increase in the transfer bitrate is provided and it is determined if the temporary increase in the transfer bitrate is applicable based on if the determined rate of change $\Delta$ for subsequent sample intervals is positive or zero. However, alternatively or in addition the capability of the network may be monitored to see if the distribution system can handle an increase in transfer rate. According to an embodiment packet drop ratio is monitored, and where increase in packet drop is utilized to indicate whether the tested transfer bitrate is too high to be delivered through the network. According to an alternative embodiment, the applicability of the tested transfer bitrate is performed by comparing interpacket arrival time at the client device and interpacket transfer time at the sending device (server at data center, telestation, broadcaster, etc.) transmitting the video stream to the device. If the interpacket arrival time and interpacket transfer time show a significant difference, the distribution system is not able to support the tested transfer bitrate/temporary bitrate. If it is determined that the network system can handle the temporarily increased transferred bitrate a decision to set the preset bitrate ($B_{enc}$ or BO) to a new higher bitrate is taken. According to an embodiment, the selection of a new bitrate Bx may be made from a list of available bitrates.

According to an embodiment, the step of temporarily increasing the transfer bitrate of the video stream is provided by adding a forwards error correction, FEC, code to said media stream.

According to the embodiment illustrated in FIG. 3, the step of temporarily increasing the transfer bitrate is provided by transferring the media stream with a momentarily higher bitrate by detaining the media stream and subsequently transmitting a short burst of data. In an example, a media stream is temporarily detained at the server, and subsequently sent with the highest available transfer bitrate 10 Mbit per second during 1 second. Now consider if the network is only capable of transporting the media stream at a 5 Mbit per second transfer bitrate, then at the client device, only half of the media stream has arrived during a 1 second window, thus the monitored bitrate will be lower than the expected 10 Mbit per second. This means that a ABR level, i.e., video stream with 5 Mbit per second or lower needs to be selected.

According to an embodiment of the inventive concept, the new bitrate Bx is selected based on manual choice or by a customer profile. This is applicable for instance if it is determined that the new bitrate Bx is below a predetermined minimum value defined as a bitrate value which is too low to sustain live transfer of the media stream. If live transfer of the media stream can no longer be supported, i.e. the dB/dt is negative and continues beyond the bit rate level L, the user may want to use a manual choice or a customer profile comprising at least one of selection between whether to abandon live transfer, and selection of priority of quality level and/or prioritized media content. When the capacity of the distribution network is very low, the user may prioritize to receive high quality of the sound, while the video data is reduced to only showing still pictures with some preselected frequency. The customer profile may be retrieved from an external source, such as a CRM system, Google account or other source.

The invention claimed is:

1. A method for adaptive bitrate adjustments in an IP network, comprising:
   monitoring a received bitrate of a media stream with a preset bitrate defined by said media stream;
   determining a rate of change of said received bitrate based on a comparison of a first received bitrate during a first time interval with a second received bitrate during a second time interval; and
   adjusting said preset bitrate based on said rate of change.

2. The method of claim 1, wherein in response to said determined rate of change being negative, said method further comprises:
   determining if the received bitrate is predicted to reach a minimum threshold level within a threshold time period, and in response to determining that the received bitrate is predicted to reach the minimum threshold level within the threshold time period,
   providing a new bitrate, relatively lower than the preset bitrate; and
   adjusting said preset bitrate to be said new bitrate.

3. The method of claim 2, wherein said threshold time period is selected to be relatively shorter the relatively closer the received bitrate level is to the minimum threshold level.

4. The method of claim 1, wherein in response to said determined rate of change being positive or zero, said method further comprises:
   temporarily increasing a transfer bitrate of the video stream to a relatively higher new bitrate,
   determining if said new bitrate is applicable; and
   in response to determining that said new bitrate is applicable,
   adjusting said preset bitrate to be said new bitrate.

5. The method of claim 4, wherein said temporarily increasing the transfer bitrate of the video stream further comprises
   adding a forwards error correction code to said media stream.

6. The method of claim 4, wherein said temporarily increasing said transfer bitrate of the video stream further comprises
   transferring said media stream with a momentarily relatively higher bitrate by detaining said media stream and subsequently transmitting a short burst of data.

7. The method of claim 5, wherein said determining if said new bitrate applicable is based on at least one of:
   said determined rate of change for subsequent sample intervals being positive or zero,
   monitoring of packet drop ratio, and
   comparing of interpacket arrival time and interpacket transfer time.

8. The method of claim 3, further comprising
   selecting said new bitrate from a list of available bitrates.

9. The method of claim 3, wherein in response to said determined new bitrate being below a minimum value, defined as a bitrate value which is too low to sustain live transfer of said media stream, said new bitrate, is selected based on manual choice or by a customer profile.

10. The method of claim 9, wherein said manual choice or customer profile comprises at least one of selection whether to abandon live transfer, and selection of priority of quality level and/or prioritized media content.

11. The method of claim 9, where said customer profile is retrieved from an external source.

12. The method of claim 1, wherein if said determined rate of change is less than a predetermined value or zero, said adjusting of said preset bitrate comprises maintaining said preset bitrate.

13. The method of claim 2, wherein in response to said determined rate of change being positive or zero, said method further comprises:
    temporarily increasing a transfer bitrate of the video stream to a relatively higher new bitrate,
    determining if said new bitrate is applicable; and
    in response to determining that said new bitrate is applicable,
    adjusting said preset bitrate to be said new bitrate.

14. The method of claim 13, wherein said temporarily increasing the transfer bitrate of the video stream further comprises
    adding a forwards error correction code to said media stream.

15. The method of claim 14, wherein said temporarily increasing said transfer bitrate of the video stream further comprises
    transferring said media stream with a momentarily relatively higher bitrate by detaining said media stream and subsequently transmitting a short burst of data.

16. The method of claim 5, wherein said temporarily increasing said transfer bitrate of the video stream further comprises
    transferring said media stream with a momentarily relatively higher bitrate by detaining said media stream and subsequently transmitting a short burst of data.

17. The method of claim 6, wherein said determining if said new bitrate applicable is based on at least one of:
    said determined rate of change for subsequent sample intervals being positive or zero,
    monitoring of packet drop ratio, and
    comparing of interpacket arrival time and interpacket transfer time.

18. The method of claim 10, where said customer profile is retrieved from an external source.

19. A node in a communication network comprising:
at least one processor configured to execute computer readable instructions for,
monitoring a received bitrate of a media stream with a preset bitrate defined by said media stream;
determining a rate of change of said received bitrate based on a comparison of a first received bitrate during a first time interval with a second received bitrate during a second time interval; and
adjusting said preset bitrate based on said rate of change.

* * * * *